Patented Oct. 10, 1933

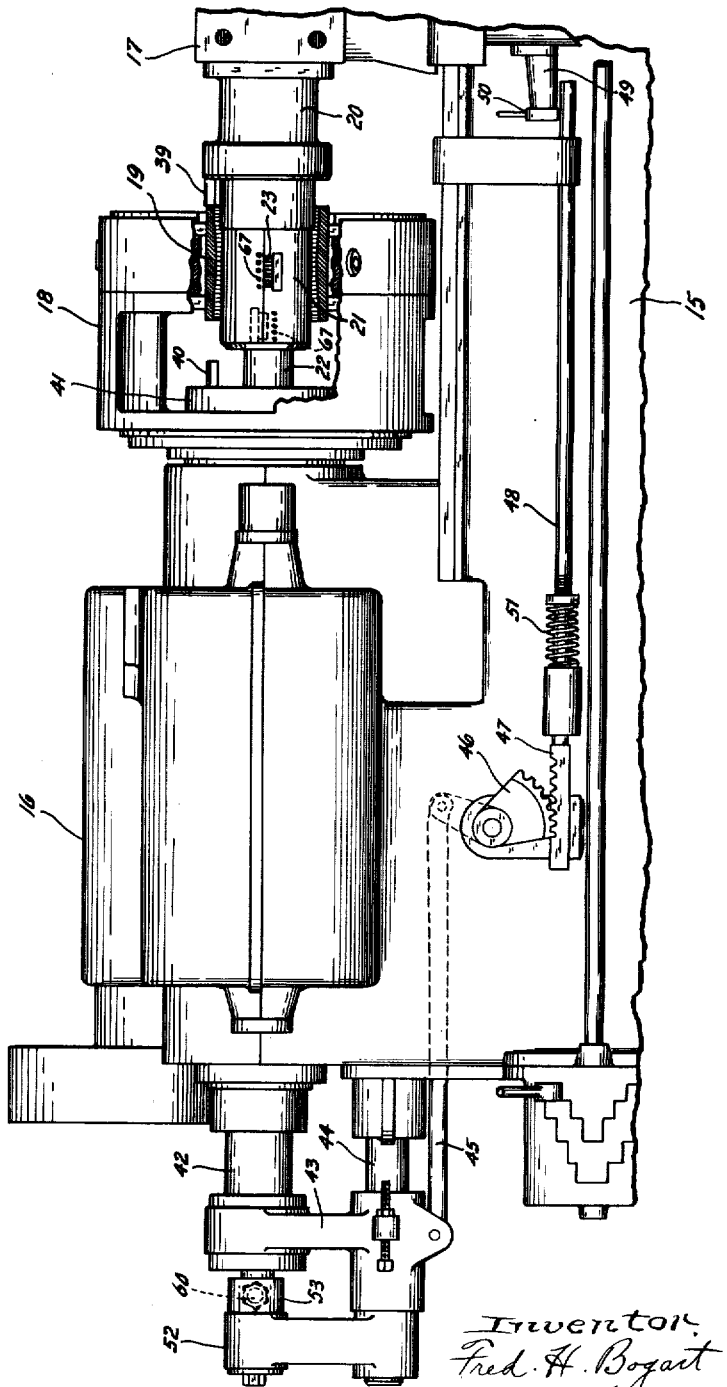

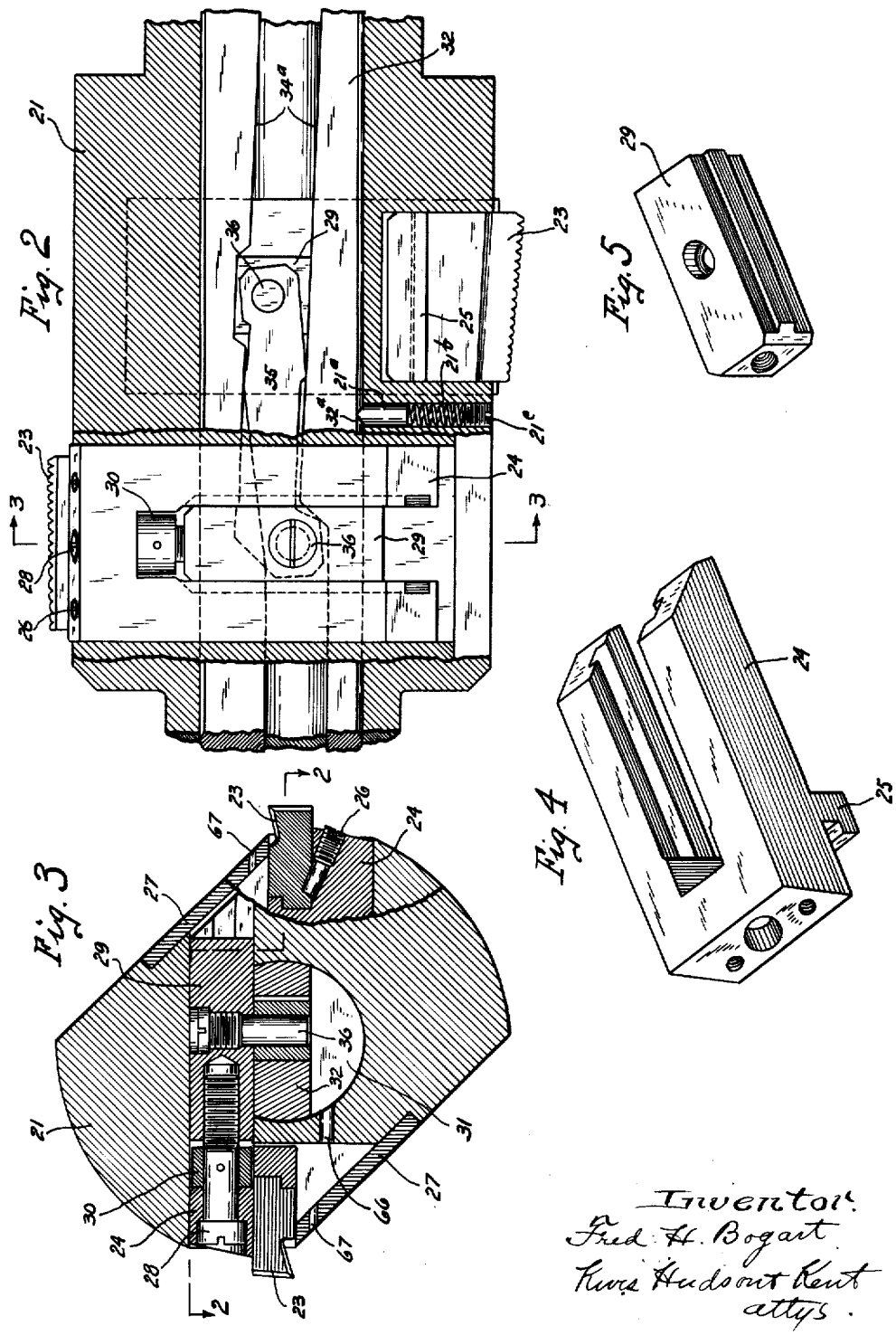

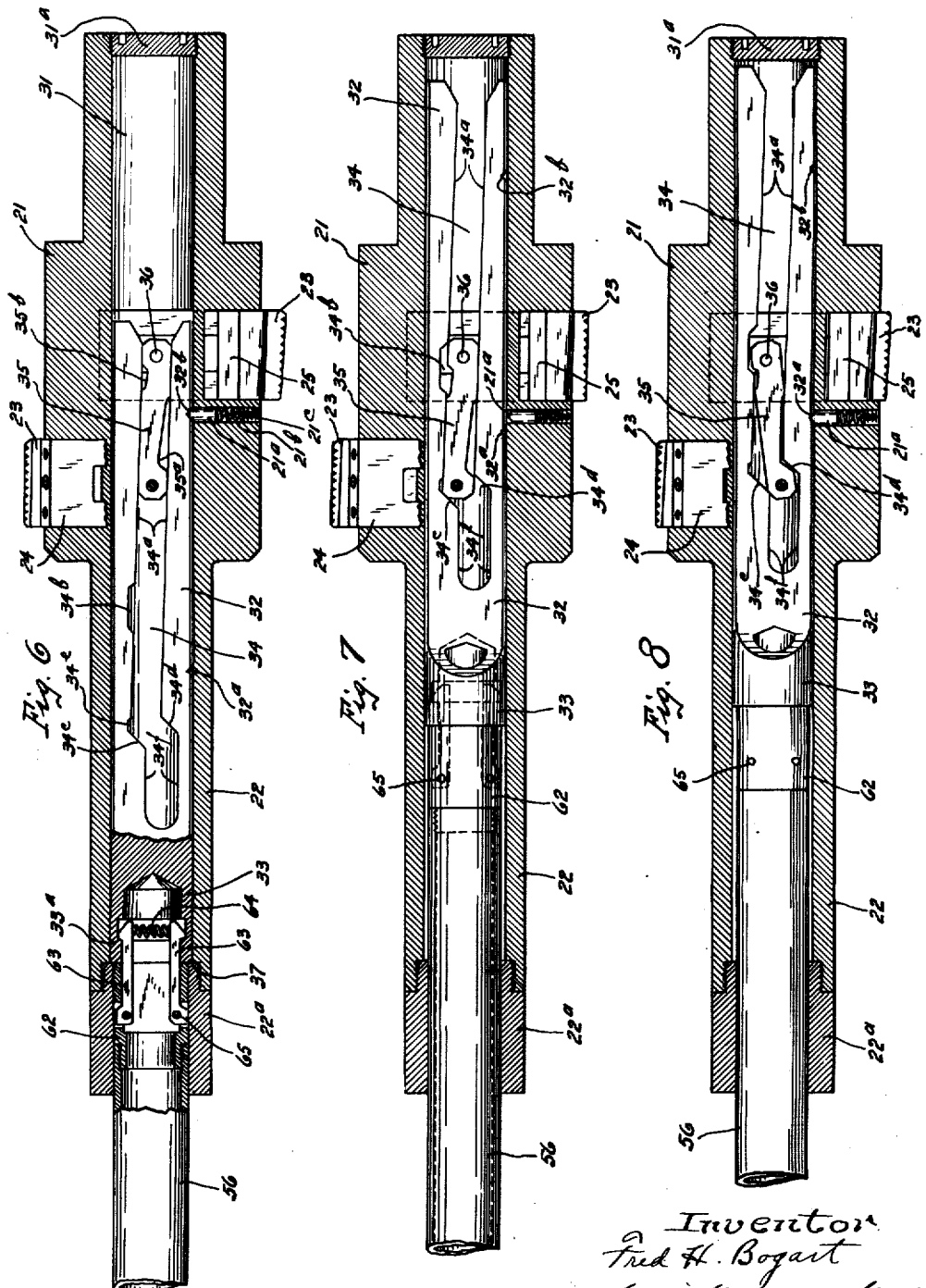

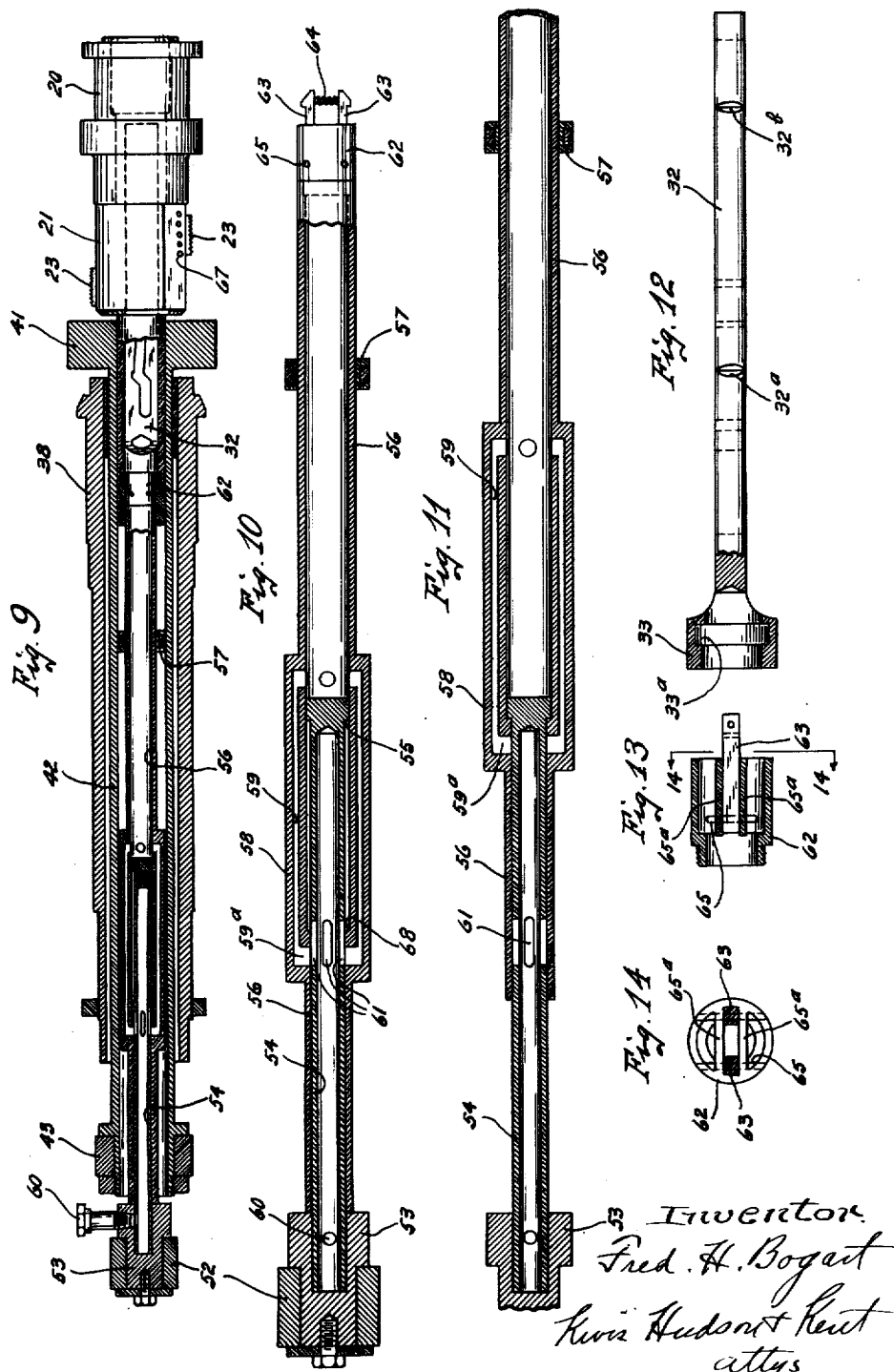

1,930,035

UNITED STATES PATENT OFFICE

1,930,035

CONTROL FOR COOLANT SUPPLIES FOR MACHINE TOOLS

Fred H. Bogart, Shaker Heights, Ohio, assignor to The Warner & Swasey Company, Cleveland, Ohio, a corporation of Ohio Original application January 30, 1928, Serial No. 250,454. Divided and this application September 26, 1929. Serial No. 395,247

17 Claims. (Cl. 29—39)

This invention relates generally to machine tools but more particularly to the control of the coolant supplied to the cutting tool or tools, this application being a division of my prior application Serial No. 250,454, filed January 30, 1928 issued February 23, 1932, as Patent No. 1,846,014.

The main object is to provide improved means for supplying a cutting compound or coolant to the tool or tools, provision being had for controlling the supplying means so that the coolant will be automatically supplied to the tool or tools at or about the beginning of the cut and throughout the cutting operation and automatically shut off at or about the completion of the cut.

An additional object is to provide a combined tool controlling and cooling supplying means, part carried by the tool holder and part by the spindle with the parts arranged so as to cooperate to accomplish the above main object, and also to provide a substantially continuous valve controlled conduit for the supply of the coolant.

A still further object is to provide means whereby a part or element carried by the tool holder is automatically connected to a coolant supplying member and subsequently automatically disconnected therefrom with the two-fold purpose of controlling the tool and forming a continuous valve controlled coolant passageway to the tool or tools of the tool holder.

The above and other objects are attained by my invention which may be briefly summarized as consisting in certain novel details of construction and combinations and arrangements of parts which will be described in the specification and set forth in the appended claims.

In the accompanying sheets of drawings, Fig. 1 is a side elevation of a portion of a machine tool, in the form of a lathe, which in this instance is adapted for boring and threading pipe couplings, portions of the machine not essential to an understanding of the invention being omitted, and a portion of the work holder, in the form of a chuck, being broken away and the coupling in the chuck being in section; Fig. 2 is a sectional view on an enlarged scale showing a portion of the tool holder with its tools, in this instance threading tools, the section being longitudinally of the tool holder substantially along the irregular line 2—2 of Fig. 3; Fig. 3 is a transverse sectional view substantially along the line 3—3 of Fig. 2, a portion being broken away; Fig. 4 is a perspective view of the slide which supports one of the tools and which in turn is slidably supported in the tool holder; Fig. 5 is a similar view of a connecting member between the slide of Fig. 4 and the follower which is controlled by the actuator; Figs. 6, 7 and 8 are longitudinal sectional views through the tool holders and through a portion of the coolant and tool controlling means supported by the spindle, Fig. 6 showing the parts in the relative positions which they occupy with the tools at or about the beginning of the cut, Fig. 7 showing them at or about the completion of the cut, and Fig. 8 showing them with the tools withdrawn from the work at or about the start of the return movement of the tool holder; Fig. 9 is a view partly in elevation and partly in section showing the tool holder and the work holding spindle, the latter and the collapsible or telescopic tool and coolant controlling means in the spindle being in section; Fig. 10 is a view on a larger scale showing the coolant and tool controlling means carried by the spindle with the parts collapsed and the ports open for the supplying of coolant to the tool holder during the cutting operation; Fig. 11 is a similar view showing the parts extended and the coolant supplying ports closed, these parts now being in the relative positions which they occupy when the tool holder has traveled back a certain distance and the tools have been restored to cutting position; Fig. 12 is a detached view of the actuator which is carried by the tool holder, a part being in section; Fig. 13 is a sectional view of the forward end of one of the coolant and tool controlling members supported by the spindle; and Fig. 14 is a sectional view substantially along the line 14—14 of Fig. 13.

Referring now to the drawings, 15 represents the bed of the machine tool, 16 the head, including a hollow spindle to be referred to presently and adapted to be rotated by any suitable mechanism incorporated in the head, and 17 represents the main tool holding slide which may be and preferably is in the form of a turret mounted in the usual manner on a turret-saddle movable along the ways of the bed 15 toward and from the head 16. In this instance, the machine illustrated is for boring and threading pipe couplings of the same general character as that disclosed in my prior application Serial No. 89,518, filed February 20, 1926 now patent No. 1,817,668, issued August 4, 1931. Accordingly, the spindle is shown provided with a chuck 18 in which is mounted a coupling 19 adapted to be bored, threaded, faced and chamfered at its ends.

When the machine is employed for boring and threading as well as for end-facing couplings, one face of the turret will be provided with a boring head, and another with a threading head, but as my invention operates the same for both heads, only one is herein illustrated, that being the threading head. This threading head is secured to the face of the turret through the medium of an adapter 20 and it includes a tool holding body 21 which may be attached to the adapter in any suitable manner. This tool holding body has a main portion which is substantially rectangular in shape, as illustrated in Fig. 3, and at the forward end it is provided with an annular, pilot-like extension 22 the forward or free end of which has a removable portion 22a, the removable feature being for the purpose of assembly or replacing the actuator with an actuator having a different cam slot, as well as to form an internal shoulder to be referred to. The two tools 23, which in this case are threading tools, project from opposite sides of the body 21, these tools being substantially diametrically opposite each other and one being in advance of the other, as indicated in Figs. 1, 2, 6, 7 and 8. Both tools are movable laterally of the axis of the tool holder for the purpose of providing a feed since the coupling is both bored and threaded on a double taper illustrated in Fig. 1. The tools are mounted identically for sliding movement in the holder 21, the mounting for each tool including a substantially U-shaped slide 24, which slides are on opposite sides of a cam bar actuator to be referred to presently. On one side of each slide is a tool receiving angular extension 25 which receives the inner end of the tool, as illustrated in Figs. 3 and 4, and the tools are held in place against this extension by screws 26. On opposite sides of the tool holding body a pair of plates 27 are provided which cover the machined openings provided to receive the tools and their slides. Each tool and its slide are adjustably connected by an adjustable screw 28 to a member 29 slidingly arranged between the legs of the forked slide 24. The screw 28 is held by a collar 30 from endwise movement with reference to the slide 24 and its inner end has threaded engagement with the member 29 so that by adjusting the screw the tool and its slide 24 are moved in or out with reference to the member 29 to suit the diameter of the work.

The tool body 21 is hollow throughout its length, the opening or bore, which is cylindrical in form, being designated 31. The rear end of this opening is closed by a plug 31a or otherwise so as to form a chamber for the coolant. Slidably mounted in this annular, axially extending bore is an actuator 32 which is movable relative to the holder 21 in an axial direction. This actuator has two oppositely disposed, flat, parallel faces which are engaged by the two tool slides 24, and it has two rounded edges which engage the inner cylindrical wall of the bore 31 (see Fig. 3). At its forward end, the actuator has a cylindrical enlargement 33 which has a sliding fit in the cylindrical bore 31, this enlargement being hollow, as best illustrated in Fig. 12, for purposes to be referred to.

The actuator 32 has an irregular cam slot 34 which extends from its rear end forwardly toward but not entirely to the enlargement 33 at its forward end. This cam slot has parallel sides and it slidingly receives a follower 35, the opposite end portions of which are pivotally connected by screw pins 36 to the members 29 associated with the two slides 24. These members 29, since they connect the follower to the slides, which in turn support the tools, may be aptly referred to as slide and follower connecting members.

The actuator, in this instance, has what may be termed a four-fold function. First, it feeds the tools during the cutting operation, one tool which bores or threads one-half the coupling being moved outwardly and the other which bores or threads the other half of the coupling being moved inwardly. Secondly, the actuator is adapted to automatically withdraw the tools from the work at the end of the cutting operation. Thirdly, it is adapted to automatically restore the tools to cutting position after the main tool holding slide has been retracted a certain or predetermined distance from the head and the tools are clear of the work. Fourthly, the actuator at a given point in the forward travel of the tool slide is automatically connected to the coolant supplying means forming a continuous passageway for the coolant from the coolant supplying pipes to the point or points where the coolant emerges from the tool holder to perform the cooling function. Likewise, the actuator is subsequently automatically disconnected from the coolant supplying means at a given point in the travel of the tool slide away from the head. These several results or functions are accomplished by the actuator by reason of its cooperation with certain parts supported by the spindle, as will be described presently.

At this point, I will describe the shape of the cam slot 34 and the shape of the follower 35 which enable the first three of these results to be accomplished by the movements of the actuator 32 relative to the tool holding body 21. It will be observed that the cam slot has a main portion 34a with parallel side edges formed on a continuous inclination the angle of which corresponds with the taper of the work. Near its forward end this cam slot has an offset, straight extension which is designated 34f, and between these two portions there are two cam faces 34c and 34d. Furthermore, the inclined portion 34a of the cam slot has two relieved portions 34e and 34b.

The follower 35 has two opposite, parallel edges which engage the opposite sides of the inclined portion 34a of the cam slot, and both edges have relieved portions 35a and 35b (see Fig. 6).

At this point, the action of the follower and of the actuator will be described with reference to the peculiar and novel shapes which are given to the cam slot and actuator. Referring to Figs. 6, 7 and 8, in Fig. 6 the follower, tools and actuator are in the relative positions which they occupy when the tools are about to start their cut. The actuator is now in its forwardmost position in the tool holding body 21 with its forward end abutting against a shoulder 37 formed by the inner end of the removable forward part of the pilot 22 of the tool holding body 21. At this time the follower is at the rear end of the inclined portion 34a of the cam slot of the actuator. As the tool holder now moves forward toward the head, the cutting begins while the actuator is held stationary in a manner to be described and during the cutting operation the follower moves forwardly in the cam slot 34 to the position shown in Fig. 7 which shows the parts at the completion of the cut. As it travels along this part of the cam slot, the forward tool 23 is moved outwardly, and the trailing tool is moved inwardly while cutting, thus cutting or forming threads on the opposite tapered portions of the coupling. When the follower and actuator reach the relative positions shown in Fig. 7, the forward end of the follower engages the cam face 34c of the cam slot, the rear end of the follower now being opposite the relieved portion 34b of the slot. Slight further forward movement of the tool holder beyond the position shown in Fig. 7 will cam the follower 35 to the position shown in Fig. 8, with the result that the tools are both withdrawn from the work piece or moved from the position shown in Fig. 7 to that shown in Fig. 8. At this point in the cycle of operations the forward movement of the main tool holding slide ceases.

Thereupon the main tool holding slide is retracted, and during the main portion of the movement of retraction the tool holding body 21, actuator 32, follower 35 and tools 23 remain in the relative positions shown in Fig. 8 until the tools are clear of the work piece, whereupon, by the action of the parts of the tool controlling means supported by the spindle (the inner and outer hollow telescopic members 54 and 56 to be later referred to), during the major portion of the remainder of the retraction of the main tool slide, the actuator 32 is held stationary. This first causes the follower 35 to be cammed back into alignment with the inclined portion of the cam slot 34 or to the position shown in Fig. 7 by means of the cam face 34d of the cam slot. This automatically restores the tools to the position shown in Fig. 7, this being the position which they occupied at the finish of the cut, and then during the continued retracting movement of the main tool slide (the actuator 32 still being held stationary), the follower moves back to the rear end of the cam slot illustrated in Fig. 6, restoring the tools to the position which they occupied at the beginning of the cut. When they reach this position the forward end of the actuator engages the shoulder 37 near the forward end of the pilot portion of the tool holding body, and during the remainder of the retracting movement of the main tool slide the tool holding body and all the parts carried by it, including the actuator, follower and tools, move as a unit.

I will next describe that portion of the mechanism which is supported by and extends through the hollow work spindle of the head, which spindle is designated 38, see Fig. 9.

At this point it might be mentioned that the complete machining of a coupling involves in addition to the boring and threading operations, the facing or the facing and chamfering of the ends of the coupling. This is accomplished by one or more tools 39 supported by the adapter 20, see Fig. 1, for facing and chamfering the outer end of the coupling, and by one or more tools 40 for facing and chamfering the inner end of the coupling. The tool or tools 40 are carried by a back-facing head 41 which is inside of the chuck 18 just forward of the spindle and it is carried by a sleeve 42 which extends entirely through the spindle and out beyond the rear end. The rear end of the sleeve 42 is attached to a slide 43 mounted on one or more guide arms 44 extending rearwardly from the head 16. This slide is adapted to be actuated by mechanism including a link 45, a lever having a segment 46 which engages a rack 47 carried by a bar 48 which is adapted to be moved forwardly to cause the tool or tools 40 to function on the inner end of the coupling as the main tool slide moves forwardly. This is preferably accomplished by providing on the saddle carrying the turret an extension 49 with an eccentric 50 which when swung to the position shown in Fig. 1 is clear of the bar 48 and when swung downwardly, will form an abutment for the bar 48 and thus move it forwardly and bring about the chamfering and facing of the inner end of the coupling. The back-facing attachment and all the parts associated therewith are adapted to be restored to their normal position by a spring 51.

This mechanism just described forms no necessary part of the present invention but is referred to inasmuch as it includes the sleeve 42 through which extend certain important parts of my invention now to be described, the latter cooperating with the actuator to control the tools in the manner explained above and also to supply coolant to the tool holder and therefore to the tools.

Taking up now this part of the invention, it will be observed that at the rear end of the head of the machine and at the outer end of the arm or arms 44 is an upstanding bracket 52 having a head with a bore, the bore being in line with the bore in the work spindle 38. In the head of this bracket is secured a portion of a fitting 53 to which is secured the rear end of a hollow inner member 54 of a telescopic tool actuator and coolant supplying and controlling means which extends through and is supported by the work spindle. The inner member 54 which is stationary and extends only part way through the spindle, as illustrated in Fig. 9, has at its forward end a head forming a shoulder 55 (see Fig. 10).

Slidable on and telescopic with respect to the inner member 54 (see Fig. 10) is an outer hollow member 56 which is adapted to extend the remainder of the distance through the spindle, this member being supported and centralized in the sleeve 42 by means of a packing member 57 which is fitted tightly onto the member 56 somewhat near its forward end. The function of this packing member is not only to centralize the member 56 in the sleeve 42 but is to prevent the escape of coolant along the exterior of the member 56.

Between the ends of the outer member 56 there is an enlargement 58 and extending lengthwise of this enlargement are a series of passageways 59 which terminate at their rear ends in ports 59a and at their forward ends open into the forward portion of the bore of the member 56 beyond the head having the shoulder 55 of the inner member 54.

Connected to the outer end of the inner member 54 is a coolant supplying pipe 60 which may be connected to any suitable source of coolant under pressure, such as a pump. This coolant may be oil or other suitable liquid, such as a cutting compound. About midway of the ends of the inner member 54 are a series of ports 61 which, when the parts 54 and 56 are collapsed or fully contracted, as in Fig. 10, are in registration with the ports 59a of the outer member 56.

At the forward end of the outer member 56 is a head 62 which carries a pair of fingers in the form of latches 63 which are pressed yieldingly apart by a spring 64. These fingers are pivoted at 65 internally of the head 62 between spaced webs 65a arranged so as not to interfere with the free flow of coolant through the said head, and they project forwardly beyond the head, as best illustrated in Fig. 6 and 13. The forward ends of the fingers are tapered, as illustrated, and when the fingers are in their normal position as held by the spring 64, they are adapted to enter the hollow enlargement 33 at the forward end of the actuator 32, the parts being so proportioned that the forward end of the outer member 56, including its head 62, may slide into the removable end 22a of the pilot portion of the tool carrying body 21. The forward ends of the fingers have the equivalent of hooks which are adapted to engage behind a shoulder 33a of the enlargement 33 of the actuator, and thus form a positive connection with the actuator, at which time the outer telescopic member 56 and the actuator are end to end, as illustrated in Fig. 6, the opening formed in the hollow enlargement 33 of the actuator forming a continuation of the conduit or bore within the outer telescopic member 56 so that coolant flowing through the latter will flow through the enlargement of the actuator and may pass through the bore of the tool holding body 21 on opposite sides of the actuator and may pass by way of passageways 66 (see Fig. 3) under the plates 27 and by additional passageways 67 therethrough directly to the tools where they engage the work. The construction of the tool holder is such that coolant thus supplied to the holder will fill or substantially fill the inner bore of the tool holding body and will flow substantially equally through the passageways to the tools so as to cool them and facilitate the cutting in the desired manner.

The function and mode of operation is as follows: When the main tool slide is fully retracted, the telescopic member is extended as in Fig. 11. At this time the ports 61 and 59a are out of registration and separated a considerable distance, as will be seen by reference to Fig. 11, and the hooks or fingers 63 will project slightly beyond the forward end of the spindle. As the main tool slide moves toward the head, the pilot of the tool carrying body 21 enters the bore of the work spindle and slidingly engages the inner wall of the sleeve 42 which, in turn, is held centrally in the bore of the work spindle. At the same time the extension 22a at the forward end of the pilot portion of the tool holder body 21 slides onto the head 62 at the forward end of the outer telescopic member 56 and the hooked ends of the fingers snap behind the shoulder 33a of the actuator 32. It will be remembered that at this time the actuator 32 and the follower 35 occupy the positions in the tool holding body 21 shown in Fig. 6. When the engagement takes place between the outer telescopic member 56 and the forward end 33 of the actuator 32, as explained, the continued forward movement of the main tool slide simply results in moving the outer telescopic member 56 backward into the spindle without changing the relative positions of the tool holding body 21 and the actuator 32. This telescopic movement of the outer member 56 relative to the inner member 54 continues until the inner or rear end of the outer member 56 abuts against the fitting 53, the engagement of these parts being illustrated in Fig. 10. Just before this engagement takes place the ports 59a and 61 come partly into registration and coolant begins to flow from the inner telescopic member 54 through these ports and through the passageways 59 into the forward portion of the outer telescopic member 56 and, therefore, into the tool holder. This flow of coolant is started just before the tools begin to cut. As soon as the engagement takes place between the outer telescopic member 56 and the fitting, as just stated, the forward movement of the actuator 32 toward the head is stopped and likewise the telescopic sliding movement of the members 54 and 56 stops. This results in the travel of the follower 35 along the cam slot of the actuator 32 and therefore produces the feed of the tools, the cutting operation starting soon after the feed begins.

The main tool slide continues its forward movement toward the head and throughout the cutting operation the actuator is held stationary by the forward end of the outer telescopic member 56, the flow of coolant continuing since the ports during the entire cutting operation are in full registration. Throughout this period, i. e., throughout the period of cutting the tools have a uniform feed in a lateral direction.

As soon as the cutting operation is completed, the follower 35 reaches the position shown in Fig. 7, whereupon the follower is cammed to the position shown in Fig. 8, causing the automatic withdrawal of the tools from the work. At this point the movement of the main tool slide is stopped and reversed (either automatically or through hand operation). During this backward or reverse movement of the tool slide, due to the fact that the fingers 63 are interlocked with the forward end of the actuator, the outer telescopic member 56 is now moved forwardly of the work spindle, immediately stopping the flow of coolant and the forward travel of the outer telescopic member continues until a shoulder 68 just forwardly of the ports 59a engages the shoulder 55 on the head at the forward end of the inner telescopic member 54, this occurring when the two telescopic members are in the relative positions shown in Fig. 11. During the forward movement of the outer telescopic member 56 just described, and before the engagement of the shoulders takes place, the tools withdrawn from the work piece are being retracted and when the engagement just described between the shoulders 68 and 55 takes place the tools are clear of the work piece.

When the engagement between the shoulders 68 and 55 takes place and the forward movement of the outer telescopic member 56 in the spindle is, therefore, stopped, the movement of the actuator 32 is temporarily stopped, with the result that the follower 35 is cammed by the cam face 34d from the position shown in Fig. 8 to the position shown in Fig. 7. For a period the actuator 32 is held stationary during the retracting movement of the main tool slide, this continuing until the follower reaches the position shown in Fig. 6, in which event the tools are moved from the position shown in Fig. 7 to that shown in Fig. 6 and are ready for the next cutting operation. At this point the inner end of the actuator 32 abuts against the shoulder 37 formed by the extension 22a of the pilot portion of the tool holding body 21. By reason of this engagement the actuator can no longer move backward through the pilot portion of the tool holding body, and when the pull on the connection afforded by the fingers 63 between the actuator and the outer telescopic member 56 reaches a predetermined value the connection is broken by the hook-shaped ends of the fingers being forced inwardly against the pressure of the spring 64. After a short further backward movement of the tool slide, the latter is stopped and the machine is ready for the next operation on another work piece.

I prefer to provide suitable means for yieldingly holding the actuator 32 in its forwardmost position in the tool holding body 21 (Fig. 6) and in its rearwardmost position in the body (Fig. 8), and this is preferably accomplished by means of a detent 21a carried by the body 21 adapted to engage two properly positioned notches 32a and 32b in the actuator 32. In the construction illustrated, the detent 21a is pressed yieldingly inward by a spring 21b, the detent and the spring being retained by a screw plug 21c in a radially disposed opening provided in the body 21, as illustrated in Figs. 2, 6, 7 and 8 of the drawings. This detent is useful in preventing accidental movement of the actuator and particularly in holding the actuator against movement when during the forward motion of the main tool slide the parts are approaching the relative positions shown in Fig. 6, until the fingers have had full engagement with the forward end of the actuator. Likewise, it prevents premature disengagement between the actuator and the fingers when the parts are approaching the relative positions shown in Fig. 6 during the retraction of the main tool slide, that is to say, it prevents disengagement between the actuator and the fingers until the shoulders 68 and 55 engage when the parts are in the positions shown in Fig. 11.

Thus it will be seen that as the main tool slide moves toward the head and work piece, interlocking engagement first occurs between the actuator carried by the tool holding body and that part of the actuator and coolant supplying means extending through and supported by the spindle. Then the latter is telescoped by the further movement of the main tool slide toward the head and just prior to the time that the tools reach cutting position the coolant begins to flow and the telescopic movement as well as the movement of the actuator is stopped, it being understood that there is now a continuous passageway for the coolant from the telescopic members past the fingers into the hollow enlargement at the forward end of the actuator and into the tool holding body so that both tools will be flooded with coolant. It will be understood also that at this time the two telescopic members and the actuator form a substantially continuous member held stationary by the abutting engagement between the rear end of the outer telescopic member 56 and the fitting 53, permitting a uniform feed of both tools to take place. Likewise, it will be understood that immediately following the completion of the cut the engagement between the rearwardly moving follower and the now stationary actuator 32 forces the follower to a position such as to withdraw the tools from the work, and upon the reversal of the movement of the main tool slide the flow of lubricant is cut off by reason of the fact that the actuator 32 pulls the outer telescopic member 56 forwardly, this continuing until the shoulder 68 engages the shoulder 55 (see Fig. 11). This again stops the movement of the actuator 32, resulting in the tool being automatically moved outwardly. The actuator is then held stationary until the tools are again restored to cutting position, whereupon the connection between the actuator 32 and the outer telescopic member 56 is broken just prior to the end of the retracting movement of the main tool slide.

My invention may find utility also in other types of machine tools than therein illustrated and I, therefore, do not intend to limit myself either to the specific mechanism and details illustrated and described nor to a machine tool for boring and threading couplings, but I aim in my claims to cover all modifications and all adaptations which do not involve a departure from the spirit and scope of the invention as set forth in the appended claims.

Having thus described my invention, what I claim is:

1. In a machine tool, a hollow spindle adapted to support a work piece, a tool holding member, the spindle and tool holding member being relatively movable toward and away from each other, and a valve controlled coolant supply means extending through the spindle and engageable by a portion of the tool holder for forming a continuous passageway for conducting the coolant through the spindle into the tool holder.

2. In a machine tool, a hollow spindle adapted to support a work piece, and a tool holding member, the spindle and tool holding member being relatively movable toward and away from each other, the tool holding member having a hollow coolant receiving portion and the spindle having means forming a continuous passageway with said hollow portions when the spindle and tool holding member are moved relatively toward each other.

3. In a machine tool, a hollow spindle adapted to support a work piece, a tool holding member, the spindle and tool holding member being relatively movable toward and away from each other, the tool holder having a hollow coolant receiving portion, and the spindle having a valve controlled coolant supplying member engageable therewith said hollow portion and said supplying member when engaged forming a continuous passageway for conducting the coolant into said hollow portion.

4. In a machine tool, a hollow spindle adapted to support a work piece, and a tool holding member, the spindle and tool holding member being relatively movable toward and away from each other, the spindle having coolant supplying means with a valve which is automatically opened by the action of the tool holder at or adjacent the beginning of the cut and which is closed at or adjacent the completion of the cut.

5. In a machine tool, a hollow spindle adapted to support a work piece, and a tool holding member, the spindle and tool holding member being relatively movable toward and away from each other, the spindle having coolant supplying means with a valve which is automatically opened during relative movement between the spindle and tool holding member in one direction and automatically closed at the start of the relative movement in the opposite direction.

6. In a machine tool, a hollow spindle adapted to support a work piece, and a tool holding member, the spindle and tool holding member being relatively movable toward and away from each other, the spindle having a telescopic coolant supplying member with ports and the tool holder having means engageable with said member to shift the parts thereof so as to bring the ports thereof into and out of registration.

7. In a machine tool, work and tool holding members the work holding member having a coolant supplying member and the tool holding member having a part engageable therewith, and the coolant supplying member having ports moved into and out of registration by the tool holder.

8. In a machine tool, work and tool holding members movable relatively toward and from each other, the tool holding member having a movable tool and an actuator therefor, and the work holding member having means engageable with said actuator to control its movement and the cooling of the tool.

9. In a machine tool, relatively movable work and tool holding members, the tool holding member having a movable tool and a tool actuating member and the work holding member having means engageable with the tool actuating member to shift the tool and to supply coolant there to.

10. In a machine tool, relatively movable work and tool holding members, the tool holding member having a movable tool and a tool actuator with a hollow portion and the work holder having a hollow coolant supplying member serving as a controller for the actuator.

11. In a machine tool, a hollow rotary work holding spindle, a tool holder movable toward and from the same, the tool holder having a movable tool and an actuator therefor at the forward end thereof and provided with a coolant passageway, and a collapsible member in the spindle having means for forming an operative connection with the actuator so as to control the position of the actuator in the tool holder and to form a substantially cntinuous conduit for the supply of coolant to the tool holder.

12. In a machine tool, a spindle and a tool holder relatively movable toward and from each other, and coolant supplying means, the tool holder having a part which is automatically coupled to the coolant supplying means during relative movement between the spindle and holder in one direction and automatically uncoupled during relative movement between these parts in the opposite direction.

13. In a machine tool, a work spindle and a tool holder, one movable toward and from the other, and coolant supplying means extending into the spindle, the tool holder having a part engageable with and disengageable from the coolant supplying means and having a passageway forming with the coolant supplying means a continuous passageway leading to the tool or tools.

14. In a machine tool, a spindle and a tool holder, one movable toward and from the other, the spindle having telescopic coolant supplying means, and the tool holder having a part engageable therewith to form a continuous passageway.

15. In a machine tool, a spindle and a tool holder relatively movable toward and from each other, one of said parts having coolant supplying means and the other having a part adapted to be coupled to and uncoupled from the same thereby forming a continuous coolant passageway leading to the tool or tools.

16. In a machine tool, a work support and a plurality of tool holders adapted to be successively brought into working relationship with the work, said support and said holders being relatively movable toward and from each other, and coolant supplying means carried by said support, the tool holders having parts which are automatically coupled successively to the coolant supplying means during relative movement between the support and holders in one direction and automatically uncoupled during said movement in the opposite direction.

17. In a machine tool, a work support and an indexible turret relatively movable toward and from each other, said turret being provided with a plurality of tool holders, coolant supplying means, and means automatically coupling said tool holders successively to the coolant supplying means during relative movement between the support and the turret in one direction and automatically uncoupling the same during relative movement in the opposite direction.

FRED H. BOGART.

CERTIFICATE OF CORRECTION.

Patent No. 1,930,035.　　　　　　　　　　　　　October 10, 1933.

FRED H. BOGART.

It is hereby certified that error appears in the printed specifications of the above numbered patent requiring correction as follows: In the grant, the heading to the printed specification and drawings, title of invention for "Control for Coolant Supplies for Machine Tools" read Control for Coolant Supply for Machine Tools; and that the said Letters Patent should be read with these corrections therein that the same may conform to the record of the case in the Patent Office.

Signed and sealed this 21st day of November, A. D. 1933.

F. M. Hopkins (Seal)　　　　　　　　　　　　　　　　　　　Acting Commissioner of Patents.

ber to shift the tool and to supply coolant thereto.

10. In a machine tool, relatively movable work and tool holding members, the tool holding member having a movable tool and a tool actuator with a hollow portion and the work holder having a hollow coolant supplying member serving as a controller for the actuator.

11. In a machine tool, a hollow rotary work holding spindle, a tool holder movable toward and from the same, the tool holder having a movable tool and an actuator therefor at the forward end thereof and provided with a coolant passageway, and a collapsible member in the spindle having means for forming an operative connection with the actuator so as to control the position of the actuator in the tool holder and to form a substantially cntinuous conduit for the supply of coolant to the tool holder.

12. In a machine tool, a spindle and a tool holder relatively movable toward and from each other, and coolant supplying means, the tool holder having a part which is automatically coupled to the coolant supplying means during relative movement between the spindle and holder in one direction and automatically uncoupled during relative movement between these parts in the opposite direction.

13. In a machine tool, a work spindle and a tool holder, one movable toward and from the other, and coolant supplying means extending into the spindle, the tool holder having a part engageable with and disengageable from the coolant supplying means and having a passageway forming with the coolant supplying means a continuous passageway leading to the tool or tools.

14. In a machine tool, a spindle and a tool holder, one movable toward and from the other, the spindle having telescopic coolant supplying means, and the tool holder having a part engageable therewith to form a continuous passageway.

15. In a machine tool, a spindle and a tool holder relatively movable toward and from each other, one of said parts having coolant supplying means and the other having a part adapted to be coupled to and uncoupled from the same thereby forming a continuous coolant passageway leading to the tool or tools.

16. In a machine tool, a work support and a plurality of tool holders adapted to be successively brought into working relationship with the work, said support and said holders being relatively movable toward and from each other, and coolant supplying means carried by said support, the tool holders having parts which are automatically coupled successively to the coolant supplying means during relative movement between the support and holders in one direction and automatically uncoupled during said movement in the opposite direction.

17. In a machine tool, a work support and an indexible turret relatively movable toward and from each other, said turret being provided with a plurality of tool holders, coolant supplying means, and means automatically coupling said tool holders successively to the coolant supplying means during relative movement between the support and the turret in one direction and automatically uncoupling the same during relative movement in the opposite direction.

FRED H. BOGART.

CERTIFICATE OF CORRECTION.

Patent No. 1,930,035.  October 10, 1933.

FRED H. BOGART.

It is hereby certified that error appears in the printed specifications of the above numbered patent requiring correction as follows: In the grant, the heading to the printed specification and drawings, title of invention for "Control for Coolant Supplies for Machine Tools" read Control for Coolant Supply for Machine Tools; and that the said Letters Patent should be read with these corrections therein that the same may conform to the record of the case in the Patent Office.

Signed and sealed this 21st day of November, A. D. 1933.

F. M. Hopkins (Seal)  Acting Commissioner of Patents.

CERTIFICATE OF CORRECTION.

Patent No. 1,930,035.                                            October 10, 1933.

FRED H. BOGART.

It is hereby certified that error appears in the printed specifications of the above numbered patent requiring correction as follows: In the grant, the heading to the printed specification and drawings, title of invention for "Control for Coolant Supplies for Machine Tools" read Control for Coolant Supply for Machine Tools; and that the said Letters Patent should be read with these corrections therein that the same may conform to the record of the case in the Patent Office.

Signed and sealed this 21st day of November, A. D. 1933.

F. M. Hopkins (Seal)                                        Acting Commissioner of Patents.